United States Patent [19]

Gilliom

[11] 4,397,875
[45] Aug. 9, 1983

[54] METHOD OF HEATING FOOD

[75] Inventor: John W. Gilliom, Wooster, Ark.

[73] Assignee: UMC Industries, Inc., Stamford, Conn.

[21] Appl. No.: 254,165

[22] Filed: Apr. 14, 1981

Related U.S. Application Data

[62] Division of Ser. No. 185,210, Sep. 8, 1980.

[51] Int. Cl.$^3$ .............................................. A23L 1/01
[52] U.S. Cl. .................................................... 426/523
[58] Field of Search ............... 426/465, 466, 520, 523, 426/808, 637, 113, 234, 394, 407, 412; 99/447, 474; 219/400; 126/21 A

[56] References Cited

U.S. PATENT DOCUMENTS

| | | | |
|---|---|---|---|
| 3,692,968 | 9/1972 | Yasuoka | 219/400 X |
| 3,828,760 | 8/1974 | Farber et al. | 219/400 X |
| 3,884,213 | 5/1975 | Smith | 219/400 X |
| 4,068,572 | 1/1978 | Vogt | 219/400 X |
| 4,132,216 | 1/1979 | Guibert | 219/400 X |
| 4,154,861 | 5/1979 | Smith | 426/466 |
| 4,155,294 | 5/1979 | Langhammer et al. | 99/427 |
| 4,297,377 | 10/1981 | Harney et al. | 426/520 X |

FOREIGN PATENT DOCUMENTS 1299009 12/1972 United Kingdom ................ 426/637

OTHER PUBLICATIONS

Consumer Reports, 11-1979, pp. 644–646, 219–400.

Primary Examiner—Arthur L. Corbin
Attorney, Agent, or Firm—Senniger, Powers, Leavitt and Roedel

[57] ABSTRACT

Apparatus for heating food, such as a serving of partially or fully precooked french fried potatoes supplied in a refrigerated or frozen state and requiring heating for being eaten, comprising a blower for blowing air, a heater for heating the air, a support for holding a receptacle containing the food in position for heating of the food by the heated air, and a system for causing the air to sweep through the receptacle and blow over and around the food in the receptacle for rapidly heating the food solely by the air. And a method of heating the food involving holding a receptacle containing food in a stream of high-velocity heated air and constraining the air to sweep through the receptacle and over and around the food in heat exchange contact with the exposed surfaces of the food.

8 Claims, 13 Drawing Figures

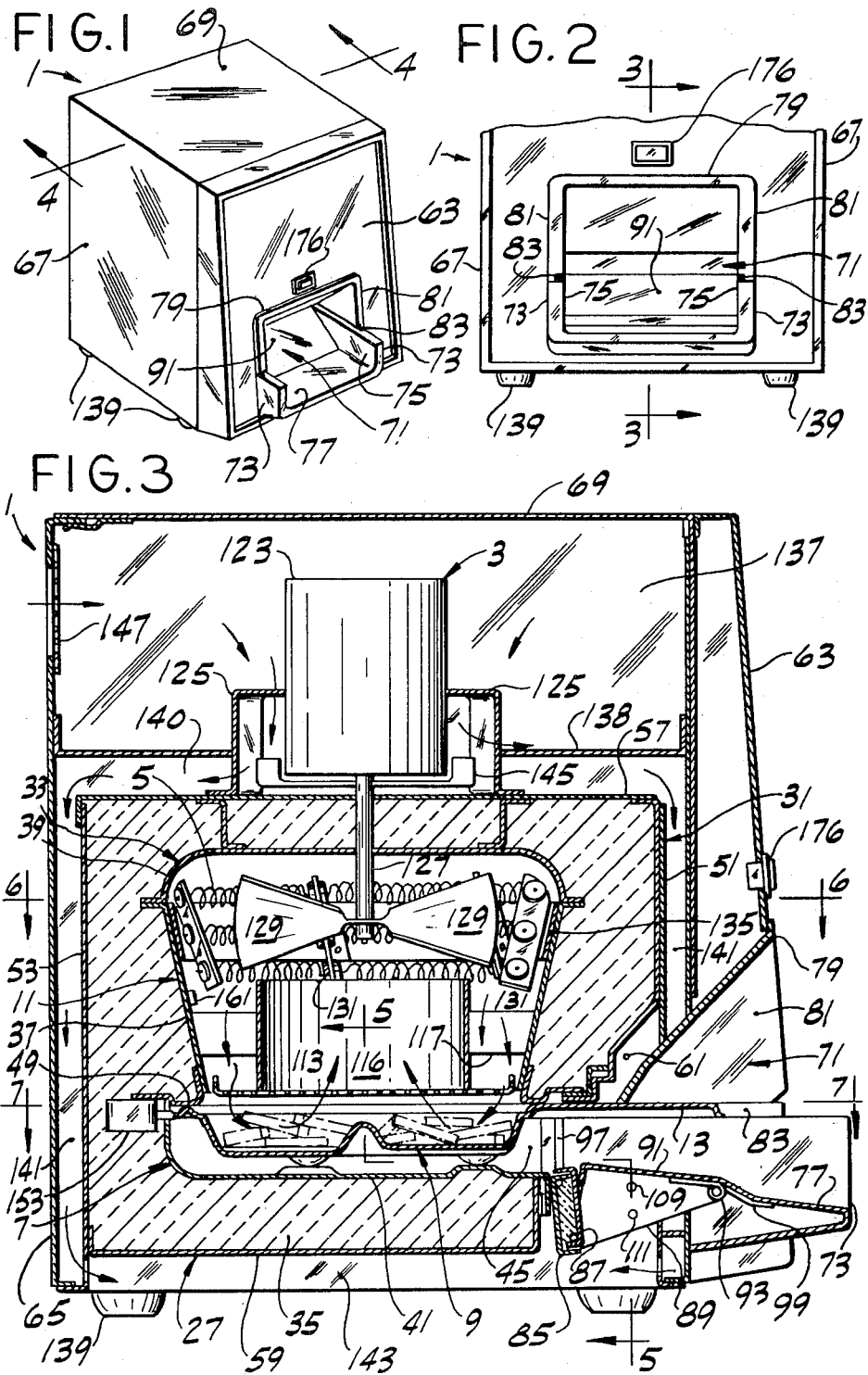

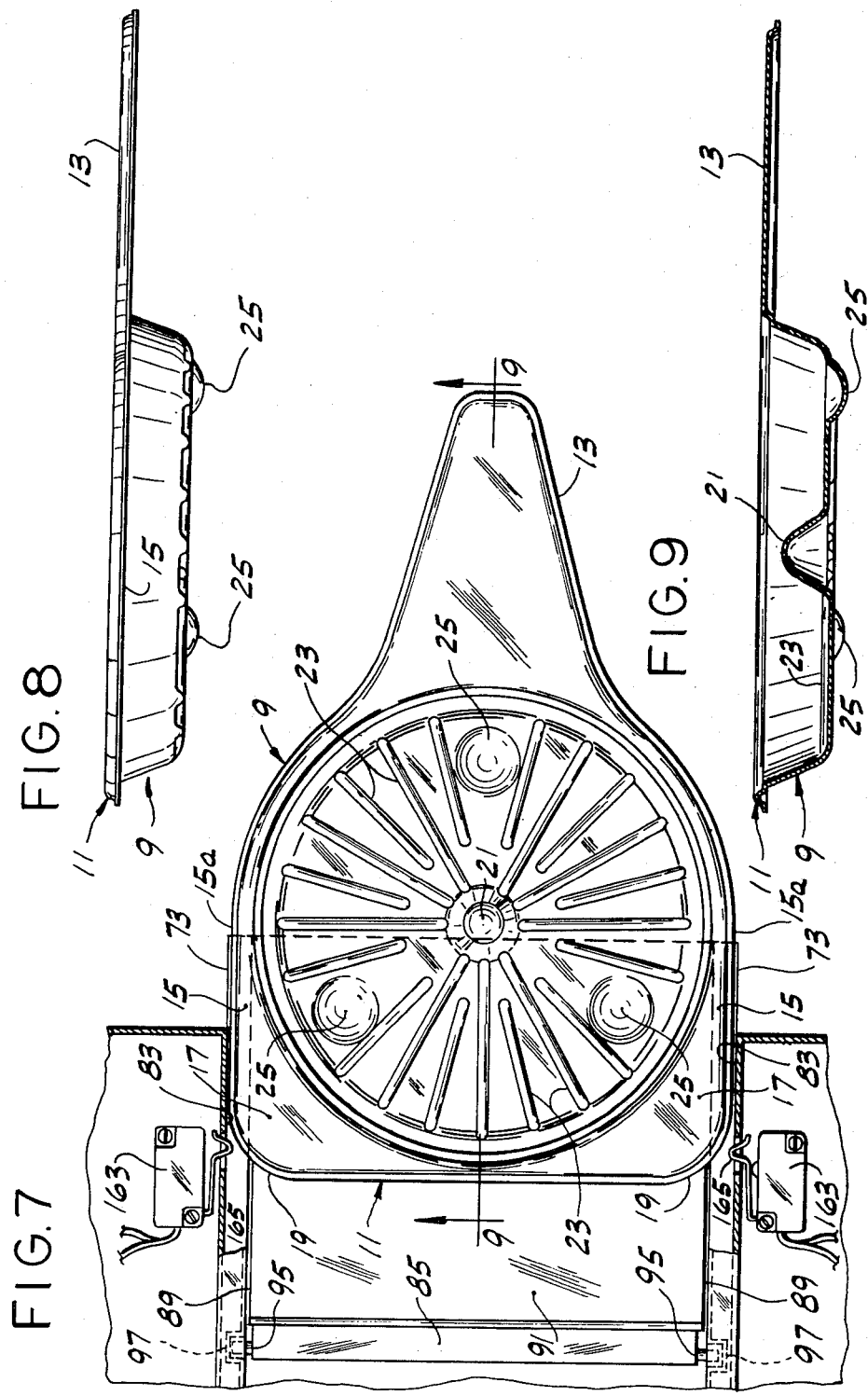

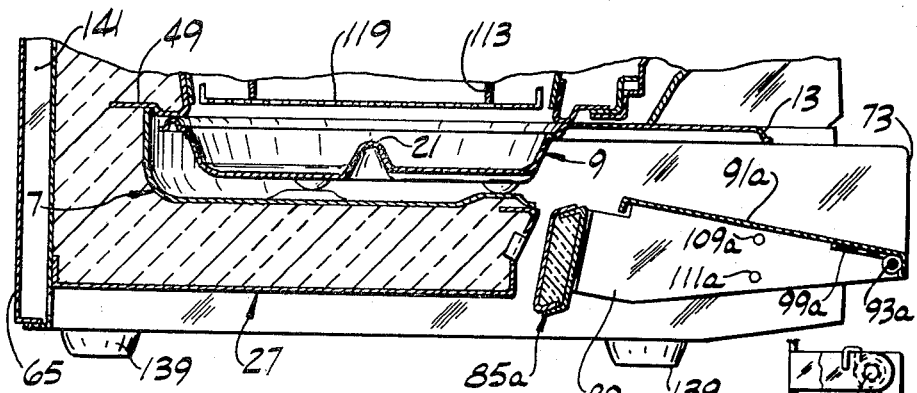
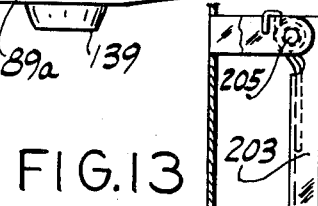
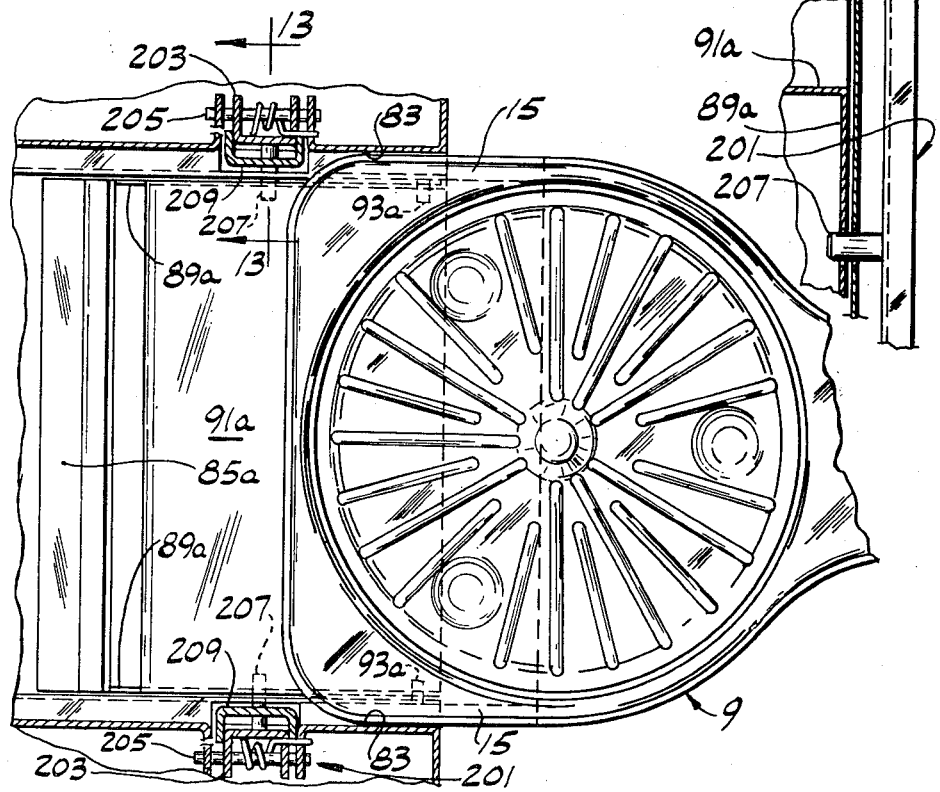

METHOD OF HEATING FOOD

This is a division of application Ser. No. 185,210, filed Sept. 8, 1980, issued as U.S. Pat. No. 4,374,318 Feb. 15, 1983.

BACKGROUND OF THE INVENTION

This invention relates to a method of heating food, such as partially or fully precooked french fried potatoes supplied in a refrigerated or frozen state and requiring heating for being eaten, and more particularly to a convection oven for and a method of convection heating such food items.

The invention is particularly directed toward providing for self-service of hot and appetizing french fried potatoes in establishments such as convenience stores, vending machine canteens, cafeterias, etc., utilizing partially or fully precooked french fried potatoes supplied in a refrigerated or frozen state, and requiring heating to bring them to serving temperature (and to complete their cooking when they are only partially precooked). The self-service requirement presents problems in respect to rapid and safe heating of the potatoes to bring them to the temperature for serving, while insuring that the potatoes are crisp, tasty and of good texture and nicely browned, preferably comparable to french fried potatoes freshly fried in hot oil in a deep fry cooker (such as available at fast food restaurants). Use of a deep fry cooker is unacceptable for self-service. Use of a microwave oven may appear to be possible for self-service but, in fact, while partially or fully precooked potatoes supplied in a refrigerated or frozen state may be rapidly heated in a microwave oven, they come out rubbery, lacking crispness and good texture, and are generally wholly unacceptable. Use of conventional ovens other than microwave ovens, including presently available convection ovens, may give satisfactory results insofar as crispness and texture of the potatoes are concerned, but require unacceptably long heating cycles and may pose safety problems, making their use unacceptable for self-service.

While the invention has been initially developed for customer self-service of french fried potatoes, it will be understood that its principles are regarded as applicable to heating the food items in general, particularly for self-service.

SUMMARY OF THE INVENTION

Among the several objects of the invention may be noted the provision of a method of heating food, such as individual servings of partially or fully precooked french fried potatoes supplied in a refrigerated or frozen state, and requiring heating for being eaten, enabling self-service of the items; the provision of such a method enabling rapid and safe heating of the food items by purchasers of the items at the place of purchase (e.g., a fast food center in a convenience store); the provision of such a method which enables the heating of the items in a disposable serving receptacle, e.g., a paper pan or plate; and the provision of such a method for heating partially or precooked french fried potatoes to be comparable to french fried potatoes freshly fried in hot oil in a deep fry cooker.

In general, the method of this invention involves associating a pan, containing food which is to be heated, with a ductwork system having an air delivery passage, adapted for delivery of air from a lower end thereof, and an air return passage extending up from its lower end, by interengaging the pan, all around the pan, with the lower end of said ductwork system to cause the pan to cooperate with the ductwork system and form an intermediate generally closed passage through which air is confined to flow from the air delivery passage to the air return passage, and causing a circulation of heated air down through the air delivery passage into the pan, through the pan, and thence up and out of the pan through the air return passage, with substantially all of the heated air exiting from the lower end of the air delivery passage flowing through the pan and over and around the food in the pan and thence up and out of the pan through the air return passage.

Other objects and features will be in part apparent and in part pointed out hereinafter.

BRIEF DESCRIPTION OF THE DRAWINGS

FIG. 1 is a perspective of a convection oven for carrying out the method of this invention;

FIG. 2 is a view in elevation of the lower part of the front of the oven, on a larger scale than FIG. 1;

FIG. 3 is a vertical front-to-rear central section on line 3—3 of FIG. 2, on a larger scale than FIG. 2, showing a receptacle in place in the oven;

FIG. 7 is a view generally on line 7—7 of FIG. 3 showing a receptacle being inserted in the oven;

FIG. 8 is a side elevation of the receptacle;

FIG. 9 is a view in section of the receptacle on line 9—9 of FIG. 7;

FIG. 11 is a view similar to the lower part of FIG. 3 showing a modification of a door of the oven;

FIG. 12 is a view similar to FIG. 7 showing the FIG. 11 modification; and

FIG. 13 is a vertical section on line 13—13 of FIG. 12.

Corresponding reference characters indicate corresponding parts throughout the several views of the drawings.

DESCRIPTION OF THE PREFERRED EMBODIMENTS

Figure 4:
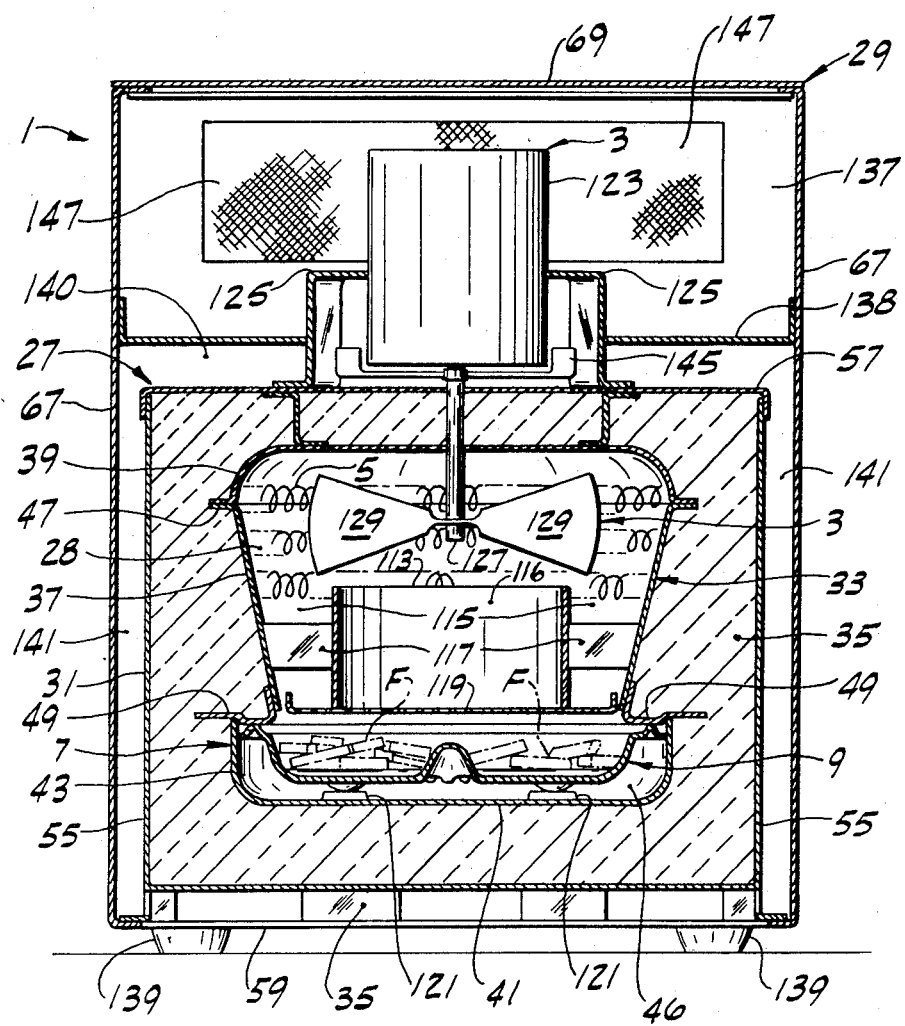
FIG. 4 is a vertical transverse central section on line 4—4 of FIG. 1, on the scale of FIG. 3, showing the receptacle in place in the oven, a heating element being broken away.

Referring to FIGS. 1-6, there is generally indicated at 1 apparatus for carrying out the method of this invention, shown generally to comprise means 3 for blowing air, means 5 for heating the air, means 7 for holding a receptacle 9 containing food F such as a serving of partially or fully precooked french fried potatoes supplied in a refrigerated or frozen state and requiring heating to a suitable temperature for being eaten, and means indicated generally at 11 (a duct system) for constraining substantially all of the air to sweep through the receptacle 9 and blow over and around the food in the receptacle (e.g. through spaces between individual french fries) for rapidly heating it to the said temperature.

The receptacle 9 is of special form, being generally in the form of a shallow circular pan having a flange formation generally designated 12 extending outwardly at its rim. This flange formation includes an integral handle 13 extending radially outwardly from the rim in what may be termed rearward direction, and side flange portions 15 extending laterally outwardly from the rim at opposite sides of the pan with respect to the handle. These side flange portions continue forward toward the front of the pan, thereby having forward corner portions 17 (at the end of the pan opposite the handle). These are preferably rounded as indicated at 19. The outer edges of the side flange portions are specially designated 15a. The pan is formed with a conical boss 21 extending up from its bottom at the center of the bottom and also with channels 23 in the bottom extending radially toward the boss for flow of air under the food. It is also provided with feet such as indicated at 25 on the bottom, shown as being formed by depressions on the bottom.

The receptacle 9 functions both as a pan for containing the food F for being heated and as a serving plate for the heated food. It is a one-time use disposable item, formed of paper or other suitable material, one which can withstand the heat to which it is subjected, preferably a material of low heat conductivity to maintain the handle 13 cool enough to be grasped for removal of the pan from the apparatus after the pan has been inserted in the apparatus and the food in the pan has been heated.

The apparatus 1 is a convection oven having a bottom, top and wall structure comprising means 27 forming a chamber indicated at 28, this means 27 being constituted by a thermally insulated oven chamber structure within an outer enclosing cabinet structure or shell designated in its entirety by the reference numeral 29. The structure 27 comprises a sheet metal jacket or outer liner 31 having a sheet metal inner liner 33 therein, with thermal insulation 35 such as ceramic wool material packed between the liner and the jacket. The inner liner 33, which defines the chamber 28, has a bottom section constituting the means 7 for holding the pan, an intermediate section 37, and a top section 39, 37 and 39 together forming an upper section constituting an air delivery and return section. The bottom section 7 is generally in the form of a shallow bowl adapted to receive the pan 9, having a bottom 41 and a peripheral wall 43 with a gap at 45 in the peripheral wall toward the front of the oven for entry of a pan 9 into the bowl by sliding it into the bowl from the front of the oven. The bowl provides a compartment 46 for the pan, and constitutes means for supporting the pan in an operative position in the oven, as will appear. The intermediate section 37 of the inner liner comprises a sheet metal shell of inverted frustoconical form open at top and bottom and having outwardly extending flanges 47 and 49 at its upper and lower ends. The lower flange 49 is suitably secured (as by welding) to the rim of the bowl 7 coaxial with the bowl and provides an annular shoulder at the top of the pan compartment 46 defined by the bowl. The top section 39 of the inner liner is generally in the form of a shallow flattopped dome, suitably secured at its lower peripheral margin to the flange 47 at the upper end of section 37.

The jacket or outer liner 31, as viewed in plan, is generally of rectangular outline. It has a front 51, back 53, sides 55, top 57 and bottom 59, with a recess 61 at the front toward the bottom. This recess 61 opens to the gap 45 in the peripheral wall of the bowl 7. The outer shell 29 of the oven, which may also be referred to as the housing of the oven, is also generally of rectangular outline as viewed in plan. It has a front 63, back 65, sides 67 and top 69, with an opening 71 in the front to the recess 61. This opening 71, the recess 61 and gap 45 provide an access opening (which may be identified by the reference numeral 71) for the compartment 46, enabling the sliding of a pan 9 into the compartment. At the sides of the opening 71 and recess 61 are side rails 73 having opposed faces 75 spaced apart a distance somewhat less than the distance between the edges 15a of the side flanges 15 of the pan 9 and somewhat greater than the outside diameter of the pan adjacent its top just below the flange formation on the pan. The rails 73 extend forward from the lower part of the jacket 31 through the opening 71 in the front of the housing 29 and beyond the front of the housing. The arrangement is such that a pan 9 may be placed between the rails 73 with the forward corner portions 17 of the flange formation of the pan resting on the upper edges of the rails, and then slid forward on the rails into the pan compartment 46. Extending between the rails 73 at the bottom and toward the front end of the rails is a lower trim member 77. An upper trim member 79 secured in the opening 71 in the front 63 of the housing 29 at the top of the opening 71 has side walls 81 in the planes of the rails 73 with the lower edges of these walls formed to provide grooves 83 for slidably receiving the side flange portions 15 of the flange formation 11 of the pan 9.

The access opening 71 to the pan compartment 46 is adapted to be closed by a thermally insulated door 85 movable up and down in front of the lower part of the jacket 31 between a lowered open position and a raised closed position. The door is pivoted by means of pins 87 extending laterally outwardly from the sides (ends) of the door adjacent the bottom of the door on a pair of arms 89 at the sides (ends) of a pivoted flap 91 and extending rearward from the trim 77. This flap is pivoted as indicated at 93 at its forward end adjacent the rearward end of the trim 77 extending between the side rails 73, with arms 89 extending down from the sides (ends) of the flap on the inside of and closely adjacent the rails. The pins 87 are at forward lower coners of the arms, the door extending up from the pins at the rear of the flap and having guide pins 95 extending laterally outwardly from its sides (ends) adjacent the top of the door slidably received in vertical guide grooves 97 in the rails 73. A spring 99 biases the flap 91 to swing upward to raise the door 85 to its closed position. The flap is adapted to be swung down to open the door by the camming engagement of a pan 9 with the flap as the pan is slid inwardly between the rails 73 over and past the trim 77.

Figure 5:
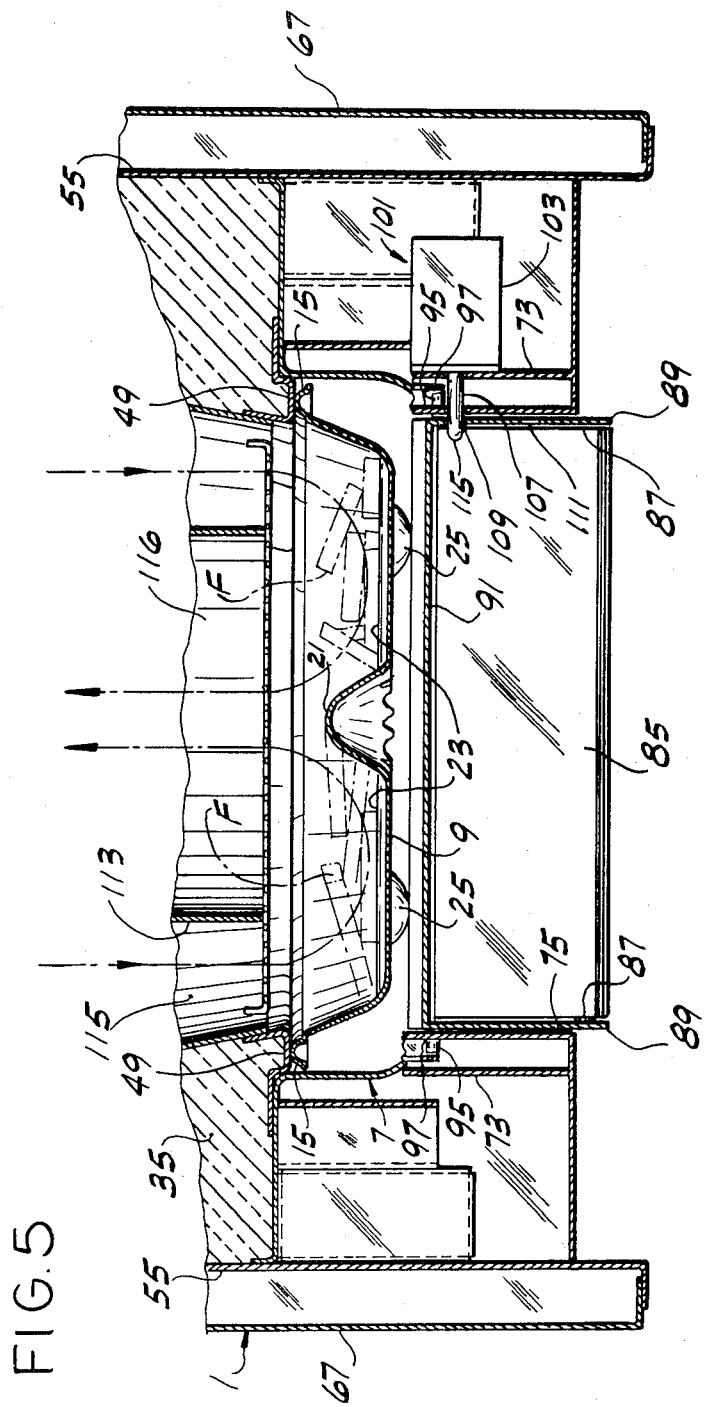
FIG. 5 is an enlarged section generally on line 5—5 of FIG. 3.
Figure 6:
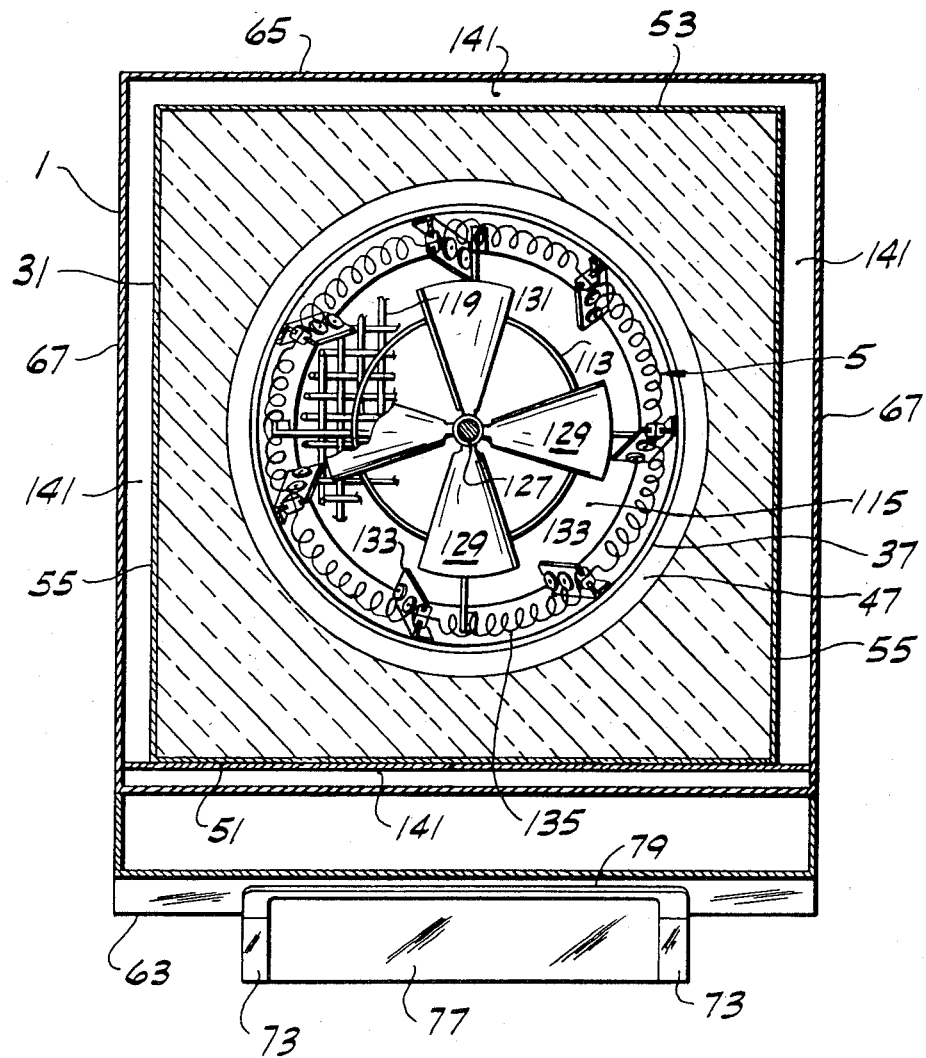
FIG. 6 is a horizontal section generally on line 6—6 of FIG. 3.

Means indicated generally at 101 in FIG. 5 is provided for latching the door 85 in its open and closed positions. This means comprises a solenoid 103 mounted on the outside of one of the side rails 73 having its plunger 105 extending slidably through a hole 107 in the rail for entry into either an upper hole 109 or a lower hole 111 (see FIG. 3) in the respective side arm 89 of the flap 91. When the flap is swung up to close the door, the plunger 105 is adapted to enter the lower hole 111 to latch the door closed, and when the flap is swung down to open the door, the plunger is adapted to enter the upper hole 109 to latch the door open (see FIG. 5). The plunger 105 is biased to its locking position by the usual solenoid spring (not shown), being retracted for unlocking the door when energized. The door is normally locked up in its closed position.

The intermediate section 37 of the inner liner 33 forms a chamber section of inverted frusto-conical shape open at the bottom to the pan compartment 46. A cylindrical sheet metal partition or duct member 113 extends axially downwardly in the section 37, with an annular space 115 surrounding 113 between it and section 37. This cylindrical duct member 113 is mounted in section 37 by means of brackets such as indicated at 117 (e.g., three of these spaced at 120° intervals therearound). It extends from the lower end of section 37 about halfway up this section. Thus, its upper end is spaced below the top of the section 37 and its lower end is generally level with the lower end of section 37, adjacent the top of compartment 46. Sections 37 and 39 and duct 113 constitute means forming an air passage having a first zone 115 extending down through the annular space 115 for downward flow of air (the air delivery passage), and a second and separate zone 116 extending up through the duct 113 for upward flow of air (the air return passage). Secured as by welding to the lower end of the duct 113 (at the lower end of section 37) is a circular wire screen or grid 119, which keeps food out of the ducts 113 and 115. The bowl 7, located below the lower end of section 37 and duct 113, is adapted to support a pan 9 with french fried potatoes or other food items therein and removably to hold it between the stated first and second zones 115 and 116 in an operative position at the lower ends of section 37 and duct 113 wherein heated air may flow from zone 115 into the receptacle, within and through the receptacle and out of the receptacle and thence into zone 116. The bowl has raised cam portions 121 on its bottom engageable by the feet 25 on the pan as the pan is slid rearward into the bowl for raising the pan for mating engagement of the flange formation 11 on the pan with the flange or shoulder 49 surrounding the lower end of section 37. Thus, the flange or shoulder 49 constitutes means for interengagement of the pan all around the pan at its rim with respect to the lower end of the ductwork system provided in the oven above the compartment 46, with the pan in surrounding relationship with respect to the lower end of both passages 115 and 116.

The means 3 for blowing air for the convection heating of the food F in the pan 9 comprises an electric fan motor 123 mounted above and spaced from the top of the casing by means of brackets 125 (of which there may be three, for example, spaced at 120° intervals) in a vertical position with its shaft 127 extending down through the top of the oven chamber structure 27 coaxial with the dome 39 and oven chamber 28 and having a fan blade 129 on the lower end of the shaft above the upper end of the duct 113. The arrangement is such that, on operation of the motor to drive the fan blade, air is blown outwardly by the blade, down in the air delivery zone 115 and into the pan 9 in the pan compartment 46, within and through the pan generally radially toward the center of the pan, up and out of the pan and up through air return zone 116 (the duct 113) back to the blade. The flow of air outwardly and downwardly from the blade is a swirling flow. The blade is preferably a centrifugal fan blade, operating, for example at approximately 3000 R.P.M. with an intake air velocity of approximately 3700 F.P.M. of air with the air at room temperature.

The means 5 for heating the air comprises an electrical resistance heating element, e.g. a 17 gauge nickel chromium alloy resistance wire capable of operating at approximately 1600° F. with the fan off (drawing 1680 watts) the wire being itself helically coiled and the helically coiled wire extending in a helix around the fan blade, being held in ceramic grommets 131 in coil supports 133 carried by a ring 135 lodged in the upper end of section 37 of the inner liner. The supports are preferably angled off vertical in such manner as to minimize their obstruction to the swirling flow of air (i.e., to prevent "dead spots").

The top of the housing 29 is spaced well above the top of the chamber structure 27, providing a compartment 137 for the motor 123 and control components of the oven. A shroud 138 is provided in this compartment surrounding the brackets 125, with a space 140 between this shroud and the top of 27. The chamber structure 27 is mounted in the housing 29 with its bottom above the bottom of the housing. The housing has feet 139 so that its bottom is spaced above the supporting surface on which the housing rests. The front, back and sides of the housing are spaced from the front, back and sides of the structure 27 providing an air passage 141 surrounding structure 27 for flow of air all around structure 27 this air passage 141 being in communication with the space 143 in the housing below said structure and with the ambient atmosphere between the bottom of the housing and the supporting surface. A fan blade 145 is provided on the shaft 127 between the lower end of the motor 123 and the top 57 of structure 27 for blowing air down in the space 141 between said structure and the housing and out at the bottom of the housing for cooling the housing. An air inlet 147 is provided for the upper part of the housing for entry of air to and exit of air from the compartment 137. The arrangement is such that on operation of motor 123, fan blade 145 blows air out in the space 140, and down in the space 141 for cooling the top of the housing and the motor, as well as the front, back and sides of the housing (and control components in compartment 137). With the motor off, there is a reverse flow of air by natural convection (upward through 141, inward through 140 and up and out of 140) for cooling purposes.

Figure 10:
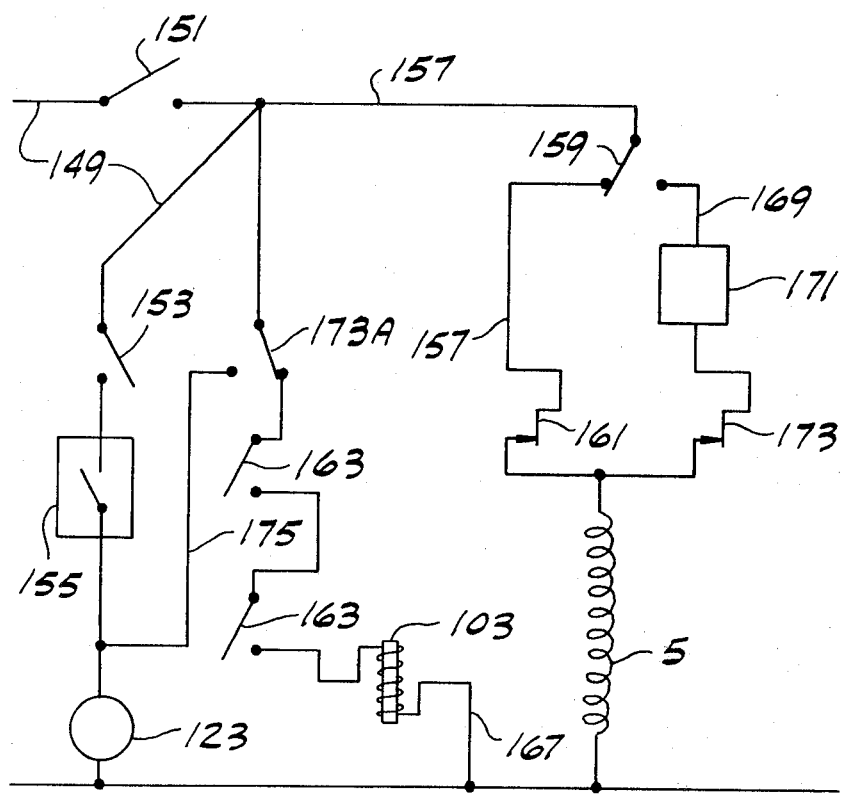
FIG. 10 is a simplified wiring diagram.

Referring to FIG. 10, the fan motor 123 is shown to be connected in a circuit 149 including a main on-off switch 151, a switch 153 which is closed by the pan 9 on full insertion of the pan into the oven (see FIG. 3), and a timer or controller 155 with the arrangement such that, with switch 151 closed, on full insertion of the pan the motor 123 is energized and held in operation for a period of time (e.g. 50 seconds) determined by the timer 155. With the motor in operation, the fan blade 129 is adapted to provide for the flow of air within the pan 9 at a relatively high velocity. In accordance with tests made to determine the optimum air velocity and air temperature for heating french fried potatoes, and in particular precooked french fried potatoes of the reconstituted type supplied by Ampco Foods, Inc., of Blackfoot, Idaho, the air velocity (as measured in the pan without potatoes in the pan) is above 1000 feet per minute, preferably in the range from about 1500 to 2000 feet per minute, and specifically about 1800 feet per minute, with the air in the 425° F. to 525° F. range.

The heating element 5 is connected in a circuit 157 including a double-throw switch 159 and a thermostat 161 under control of the main switch 151. In the operation of the oven, the latter switch is generally left on all the time during serving hours, so that the oven remains heated and does not need warming up for each use. The thermostat 161 is adapted to maintain the oven heated to a temperature such as to provide for the flow of air at a temperature above 425° F., preferably in the range from about 425° F. to 525° F., and specifically about 475° F.

(for the above-noted french fried potatoes) within the pan 9 when the fan is on. The thermostat is adjustable for setting the temperature, and is preferably one with a relatively narrow differential, no higher than ±5° F., and preferably about ±2° F., to enable maintaining the highest temperature at which french fried potatoes can be heated without being subjected to burning (due to high heat) when the heating element 5 is on.

Referring to FIG. 7, two switches each designated 163 are shown to be mounted on the outside of the rails 73 with their actuators 165 reaching into the grooves 83 for engagement by the side flange portions 15 of a pan 9 as the pan is slid into (and out of) the oven. The latch solenoid 103 is connected in a circuit 167 including these two pan-actuated switches 163 under control of the main switch 151. Switches 163 are normally open. On insertion of a pan 9, they are briefly closed and, with the main switch 151 closed, complete the solenoid circuit 167 for retraction of the latch plunger 105 to release the door 85 to swing down to its open position. The actuators 165 for switches 163 are so located that the switches open as the pan 9 completes its entry into the oven, close as the pan is pulled out, and open as the pan completes its exit from the oven.

Provision may be made for making the oven self-cleaning, using the heating element 5, via a cleaning circuit 169 including the double-throw switch 159, a cleaning cycle timer 171, the fan motor 123, and a cleaning cycle thermostat 173. Element 5 is adapted to heat the oven to a sufficiently high temperature for pyrolitic cleaning. The arrangement is such that by throwing switch 159 to complete the cleaning circuit 169 (and break the circuit to thermostat 161), the heating element 5 is energized under control of timer 171 and thermostat 173 for a cleaning cycle. The circuit 167 includes a thermostat 173A having double-throw contacts normally closed to complete the circuit 167. This thermostat 173A is responsive to oven temperature, being operable to open the circuit 167 and to close a circuit 175 for the fan motor 123 when the oven heats up for cleaning. For example, thermostat 173A opens circuit 167 and closes circuit 175 when the oven reaches a temperature of 550° F. Thus, the system maintains the fan on during the cleaning cycle to provide the air wash for cooling the shell of the oven, as well as internal air circulation. With circuit 167 open, solenoid 103 is deenergized so that the door 85 is locked in its closed position during the cleaning cycle, prohibiting user's access to any of the interior surfaces of the oven while they are at elevated temperature.

The oven 1, as above described, is particularly useful for customer self-service of french fried potatoes in a convenience store, for example, in an operation in which the customer buys a package of partially or fully precooked french fried potatoes (kept in a refrigerated cabinet), obtains a pan 9 from an available supply (e.g., from a suitable pan dispenser), places the potatoes in the pan, slides the pan in the oven for heating the potatoes, then, when the potatoes have been heated, pulls the pan out of the oven by the handle 13 (which remains cool), eats the potatoes from the pan, and throws the pan away. The oven 1 is also useful, for example, in an operation in which the customer buys the potatoes already packaged in the pan.

To minimize the time required for heating the potatoes, the oven is maintained in readiness by keeping switch 151 closed for continuous operation of the heating element 5 under control of the low-differential thermostat 161. For self-service, the time should be less than 2 minutes, and preferably less than 75 seconds. With the oven already hot, the customer inserts the pan 9 with the potatoes therein into the pan compartment 46 by positioning the forward end of the pan between the rails 73 with the side flange portions 15 of the pan on the top edges of the rails, and sliding the pan forward with the side flange portions 15 sliding in the grooves 83, the pan being pushed forward to the point where it is centered in the compartment 46 and raised (by the upward camming action of cams 121 on the feet 25 of the pan) for mating engagement of the rim of the pan with the flange or shoulder at the lower end of the inner liner section 37. This engagement is sufficient to provide a reasonably air-tight seal as between the rim of the pan and the flange or shoulder. The handle 13 of the pan is out of the oven so that it stays cool.

As the pan is slid into the oven, its side flange portions 15 engage the actuators 165 of the switches 163, thereby actuating these switches. This effects energization of the solenoid 103 to retract the latch plunger 105 to release the door 85. As the pan is slid inward, the forward end of the bottom of the pan engages the flap 91 and wedges it down so that the flap pulls the door 85 down to its open position, thereby to enable entry of the pan in the compartment 46. When the side flange portions 15 of the pan pass the actuators 165, switches 163 open, thereby deenergizing the solenoid 103 and allowing the latch plunger 105 to move forward into engagement with the outside of the arm 89 of flap 91 at the right side as viewed in FIG. 5. When this arm is fully down, the plunger snaps into the hole 109 in the arm to latch the door down and open (see FIG. 5).

When the pan reaches its operative position (FIG. 3) in compartment 46, it actuates the switch 153 to energize the fan motor 123 via the timer 155. Blade 129 thereupon blow air in a closed-loop path outwardly at the top of chamber 28, down through the air passage zone 115, into the pan 9, inwardly within the pan generally radially of the pan toward the center of the pan, up and out of the pan into the air passage zone 116 (duct 113), and up through the latter and back to the fan blades 129. The dome 39 has a curved peripheral formation assisting the transition of the flow of air from radially outwardly of the fan blade 129 to downwardly in the zone 115. The peripheral wall of the pan is shaped as shown in FIGS. 3–5 and 9 to assist the transition of the flow of air from downwardly within the pan generally in a circle all around the pan on the inside of the peripheral wall of the pan to inwardly (generally horizontally) within the pan. The conical boss 21 at the center of the pan keeps potatoes from bunching up in the center of the pan where the heating efficiency is lower. The pan 9, when in its operative position, forms the closed-loop recirculating path for the air, in conjunction with zones 115 and 116.

Air blown radially outwardly by the fan blades 129 passes over the heating element 5 and is heated thereby for its flow downwardly through the zone 115 and thence radially inwardly into the pan and horizontally within the pan. The hot air sweeps through the pan, blowing over and around the surfaces of the pieces of potato in the pan in heat exchange contact with their exposed surfaces, and rapidly heats them to complete their cooking, brown them, and bring them up to appropriate temperature for serving. While the door 85 is open, the hot air blows through the closed-loop path down in the annular passage 115, within the pan inwardly toward the center of the pan, and up through the duct 113 without any undue escape of air from the oven chamber 28 because the pan itself forms part of the air ducting system and closes it off forming an intermediate generally closed passage through which air flows from passage 115 to passage 116. Thus, substantially all of the air exiting from 115 is confined or constrained to sweep through the pan and substantially simultaneously to contact substantially all the exposed surfaces of the pieces in the pan for rapidly heating them, solely by the air, and then to flow up and out of the pan and through 116.

At the end of the period of time (e.g., 50 seconds) allotted for heating the potatoes by the timer 155, the latter breaks the circuit for the fan motor 123. A signal light as at 175 and/or a buzzer may be used to signal that the heating has been completed. The customer then takes hold of the pan handle 13 (which is cool enough to be readily grasped) and pulls the pan out of the oven, the pan then functioning as a serving plate for the potatoes, and being disposed of after being so used. As the pan is pulled out, switches 163 are actuated to energize the solenoid 103 and retract the latch plunger 105 to release the door 85 from its latched-down open position. The door springs up against the bottom of the pan and thereby stays open until the pan is pulled out past the door, whereupon the door springs up to its closed position. At this point, the side flange portions 15 of the pan have released the actuators 165 of switches 163, and the solenoid is deenergized so that plunger 105 snaps into the hole 109 in the arm 89 to lock the door closed. This holds heat in the oven, and prevents insertion of extraneous matter into the pan compartment 46. Other suitable means than that shown may be used for holding the door down in its open position when the pan is in compartment 46 to enable the pan to be pulled out.

The parameters for the air temperature and the air velocity are based on tests which were conducted to determine the range of and optimum air temperature and air velocity for heating partially or fully precooked french fried potatoes from the freezer or refrigerator in an appropriate time (e.g., about one minute) for self-service operations with the potatoes, as heated in the serving receptacle or pan, being comparable in crispness, taste and texture to the same potatoes freshly fried in hot oil in a deep fry cooker (i.e., comparable to conventionally prepared french fried potatoes). In each test, precooked french fried potatoes of the reconstituted type supplied by Ampco Foods, Inc. of Blackfoot, Idaho were placed in a receptacle (pan), and heated for a predetermined period of time by blowing hot air within the receptacle over and around the potatoes, sampling the heated potatoes and rating them according to the taster's best judgment for hotness, crispness, texture and browning on a scale of 1 to 5, 5 being Excellent, 4 Good, 3 Acceptable, 2 Marginal and 1 Unacceptable. As to "browning", a rating of 5 means nicely browned, a rating of 1 means either not browned at all or burned. In each table, the air temperature and time are stated at the top, air velocity in feet per minute at the left, the ratings are tabulated in the vertical columns under H for Hotness, C for Crispness, T for Texture and B for Browning, and average ratings are tabulated at the right. In the tests tabulated in Tables 1–6, frozen potatoes taken from the refrigerator in frozen condition were used. In the tests tabulated in Tables 7–12, potatoes which had been initially frozen but which had been kept in a "medium temperature" (about 38° F.) refrigerated cabinet for two days were used. Tables 4–6 correspond to Tables 1–3 in terms of air temperature, air velocity and time, but with the test data weighted on the scale of 2 points for hotness, 3 points for crispness, 3 points for texture and 2 points for browning (total rating if Excellent—10 points). Similarly Tables 10–12 correspond to Tables 7–9 in terms of air temperature, air velocity and time, but with the test data weighted on the scale of 2 points for hotness, 3 points for crispness, 3 points for texture and 2 points for browning (total rating if Excellent—10 points).

TABLE 1

| AIR VELOCITY F.P.M. | TEST: 1 | | | | 2 | | | | 3 | | | | 4 | | | | 5 | | | | AVERAGED RATINGS |
|---|---|---|---|---|---|---|---|---|---|---|---|---|---|---|---|---|---|---|---|---|---|
| | H | C | T | B | H | C | T | B | H | C | T | B | H | C | T | B | H | C | T | B | |
| 2400 | 5 | 3 | 3 | 5 | 5 | 4 | 3 | 4 | 5 | 5 | 4 | 4 | | | | | | | | | 16.7 |
| 2100 | 3 | 3 | 3 | 5 | | | | | | | | | | | | | | | | | 14.0 |
| 1800 | 3 | 1 | 3 | 3 | 3 | 2 | 3 | 3 | 3 | 2 | 3 | 3 | | | | | | | | | 10.7 |
| 1500 | 4 | 2 | 3 | 4 | | | | | | | | | | | | | | | | | 13.0 |
| 1000 | 1 | 1 | 1 | 3 | 2 | 2 | 2 | 3 | 1 | 2 | 2 | 2 | | | | | | | | | 7.3 |

TEMP: 425° F.   TIME: 50 sec.

TABLE 2

| AIR VELOCITY F.P.M. | TEST: 1 | | | | 2 | | | | 3 | | | | 4 | | | | 5 | | | | AVERAGED RATINGS |
|---|---|---|---|---|---|---|---|---|---|---|---|---|---|---|---|---|---|---|---|---|---|
| | H | C | T | B | H | C | T | B | H | C | T | B | H | C | T | B | H | C | T | B | |
| 2400 | 5 | 5 | 5 | 5 | 5 | 3 | 3 | 3 | 5 | 4 | 4 | 3 | 5 | 4 | 4 | 4 | | | | | 16.8 |
| 2100 | 5 | 3 | 3 | 1 | 5 | 4 | 5 | 5 | 5 | 4 | 5 | 4 | | | | | | | | | 16.3 |
| 1800 | 5 | 5 | 5 | 5 | 5 | 5 | 5 | 5 | 5 | 5 | 4 | 4 | 5 | 4 | 5 | 5 | 5 | 5 | 4 | 5 | 19.2 |
| 1500 | 2 | 5 | 5 | 5 | 3 | 3 | 3 | 5 | 4 | 4 | 4 | 5 | 4 | 4 | 4 | 5 | | | | | 16.3 |
| 1000 | 1 | 2 | 1 | 5 | 1 | 1 | 2 | 3 | 2 | 2 | 3 | 4 | 3 | 3 | 3 | 5 | 3 | 2 | 2 | 3 | 10.2 |

TEMP: 475° F.   TIME: 50 sec.

TABLE 3

| AIR VELOCITY F.P.M. | TEST: 1 | | | | 2 | | | | 3 | | | | 4 | | | | 5 | | | | AVERAGED RATINGS |
|---|---|---|---|---|---|---|---|---|---|---|---|---|---|---|---|---|---|---|---|---|---|
| | H | C | T | B | H | C | T | B | H | C | T | B | H | C | T | B | H | C | T | B | |
| 2400 | 5 | 3 | 4 | 3 | 5 | 3 | 3 | 3 | 5 | 3 | 4 | 3 | | | | | | | | | 14.7 |
| 2100 | | | | | | | | | | | | | | | | | | | | | |
| 1800 | 5 | 5 | 5 | 4 | 5 | 5 | 5 | 4 | 5 | 5 | 5 | 4 | | | | | | | | | 19.1 |

TEMP: 525¼° F.   TIME: 50 sec.

TABLE 3-continued

TEMP: 525¼ F.   TIME: 50 sec.

| AIR VELOCITY F.P.M. | TEST: 1 H C T B | 2 H C T B | 3 H C T B | 4 H C T B | 5 H C T B | AVERAGED RATINGS |
|---|---|---|---|---|---|---|
| 1500 | | | | | | |
| 1000 | 3 3 3 3 | 4 4 3 3 | 3 3 3 3 | | | 12.7 |

TABLE 4

TEMP: 425¼ F.   TIME: 50 sec.

| AIR VELOCITY F.P.M. | TEST: 1 H C T B | 2 H C T B | 3 H C T B | 4 H C T B | 5 H C T B | AVERAGED RATINGS |
|---|---|---|---|---|---|---|
| 2400 | 0.2 1.8 1.8 0.2 | 0.2 2.4 1.8 1.6 | 0.2 0.3 2.4 1.6 | | | 8.1 |
| 2100 | 1.2 1.8 1.8 0.2 | | | | | 6.8 |
| 1800 | 1.2 0.6 1.8 1.2 | 1.2 1.2 1.8 1.2 | 1.2 1.2 1.8 1.2 | | | 5.2 |
| 1500 | 1.6 1.2 1.8 1.6 | | | | | 6.2 |
| 1000 | 0.4 0.6 0.6 1.2 | 0.8 1.2 1.2 1.2 | 0.4 1.2 1.2 0.8 | | | 3.6 |

TABLE 5

TEMP: 475¼ F.   TIME: 50 sec.

| AIR VELOCITY F.P.M. | TEST: 1 H C T B | 2 H C T B | 3 H C T B | 4 H C T B | 5 H C T B | AVERAGED RATINGS |
|---|---|---|---|---|---|---|
| 2400 | 0.2 0.3 0.3 0.2 | 0.2 1.8 1.8 1.2 | 0.2 2.4 2.4 1.2 | 0.2 2.4 2.4 1.6 | | 8.3 |
| 2100 | 0.2 1.8 1.8 0.4 | 0.2 2.4 0.3 0.2 | 0.2 2.4 0.3 1.6 | | | 8.1 |
| 1800 | 0.2 0.3 0.3 0.2 | 0.2 0.3 0.3 0.2 | 0.2 0.3 2.4 1.6 | 0.2 2.4 0.3 0.2 | 0.2 0.3 2.4 0.2 | 9.6 |
| 1500 | 0.8 0.3 0.3 0.2 | 1.2 1.8 1.8 0.2 | 1.6 2.4 2.4 0.2 | 1.6 2.4 2.4 0.2 | | 8.1 |
| 1000 | 0.4 1.2 0.6 0.2 | 0.4 0.6 1.2 1.2 | 0.8 1.2 1.8 1.6 | 1.2 1.8 1.8 0.2 | 1.2 1.2 1.2 1.2 | 4.9 |

TABLE 6

TEMP: 525¼ F.   TIME: 50 sec.

| AIR VELOCITY F.P.M. | TEST: 1 H C T B | 2 H C T B | 3 H C T B | 4 H C T B | 5 H C T B | AVERAGED RATINGS |
|---|---|---|---|---|---|---|
| 2400 | 0.2 1.8 2.4 1.2 | 0.2 1.8 1.8 1.2 | 0.2 1.8 2.4 1.2 | | | 7.2 |
| 2100 | | | | | | |
| 1800 | 0.2 0.3 0.3 1.6 | 0.2 0.3 0.3 1.6 | 0.2 0.3 0.3 1.6 | | | 9.6 |
| 1500 | | | | | | |
| 1000 | 1.2 1.8 1.8 1.2 | 1.6 2.4 1.8 1.2 | 1.2 1.8 1.8 1.2 | | | 6.3 |

TABLE 7

TEMP: 425° F.   TIME: 70 sec.

| AIR VELOCITY F.P.M. | TEST: 1 H C T B | 2 H C T B | 3 H C T B | 4 H C T B | 5 H C T B | AVERAGED RATINGS |
|---|---|---|---|---|---|---|
| 2400 | 5 3 3 3 | 5 3 3 3 | | | | 14.0 |
| 2100 | 5 3 3 3 | 5 3 3 3 | | | | 14.0 |
| 1800 | 5 1 1 3 | 5 1 1 3 | | | | 10.0 |
| 1500 | 5 1 1 3 | 5 1 1 3 | | | | 10.0 |
| 1000 | 3 1 1 3 | 3 2 1 3 | | | | 8.5 |

TABLE 8

TEMP: 475° F.   TIME: 70 sec.

| AIR VELOCITY F.P.M. | TEST: 1 H C T B | 2 H C T B | 3 H C T B | 4 H C T B | 5 H C T B | AVERAGED RATINGS |
|---|---|---|---|---|---|---|
| 2400 | 5 1 3 3 | 5 1 3 3 | 5 2 4 2 | 5 2 2 2 | | 12.0 |
| 2100 | 5 4 4 3 | 5 4 4 3 | | | | 16.0 |
| 1800 | 5 3 3 3 | 5 4 4 5 | 5 4 4 5 | 5 4 4 4 | | 16.8 |
| 1500 | 5 2 2 3 | 5 2 2 3 | | | | 12.0 |
| 1000 | 5 1 1 3 | 5 1 1 3 | 5 1 1 3 | 5 1 2 3 | | 10.3 |

TABLE 9

TEMP: 525¼ F.   TIME: 70 sec.

| AIR VELOCITY F.P.M. | TEST: 1 H C T B | 2 H C T B | 3 H C T B | 4 H C T B | 5 H C T B | AVERAGED RATINGS |
|---|---|---|---|---|---|---|
| 2400 | 5 1 1 1 | | | | | 8.0 |
| 2100 | | | | | | |
| 1800 | 3 3 2 1 | | | | | 11.0 |

TABLE 9-continued

| AIR VELOCITY F.P.M. | TEMP: 525¼ F. TIME: 70 sec. | | | | | | | | | | | | | | | | | | | | AVERAGED RATINGS |
|---|---|---|---|---|---|---|---|---|---|---|---|---|---|---|---|---|---|---|---|---|---|
| | TEST: 1 | | | | 2 | | | | 3 | | | | 4 | | | | 5 | | | | |
| | H | C | T | B | H | C | T | B | H | C | T | B | H | C | T | B | H | C | T | B | |
| 1500 | | | | | | | | | | | | | | | | | | | | | |
| 1000 | 2 | 1 | 1 | 2 | | | | | | | | | | | | | | | | | 6.0 |

TABLE 10

| AIR VELOCITY F.P.M. | TEMP: 425¼ F. TIME: 70 sec. | | | | | | | | | | | | | | | | | | | | AVERAGED RATINGS |
|---|---|---|---|---|---|---|---|---|---|---|---|---|---|---|---|---|---|---|---|---|---|
| | TEST: 1 | | | | 2 | | | | 3 | | | | 4 | | | | 5 | | | | |
| | H | C | T | B | H | C | T | B | H | C | T | B | H | C | T | B | H | C | T | B | |
| 2400 | 0.2 | 1.8 | 1.8 | 1.2 | 0.2 | 1.8 | 1.8 | 1.2 | | | | | | | | | | | | | 6.8 |
| 2100 | 0.2 | 1.8 | 1.8 | 1.2 | 0.2 | 1.8 | 1.8 | 1.2 | | | | | | | | | | | | | 6.8 |
| 1800 | 0.2 | 0.6 | 0.6 | 1.2 | 0.2 | 0.6 | 0.6 | 1.2 | | | | | | | | | | | | | 4.4 |
| 1500 | 0.2 | 0.6 | 0.6 | 1.2 | 0.2 | 0.6 | 0.6 | 1.2 | | | | | | | | | | | | | 4.4 |
| 1000 | 1.2 | 0.6 | 0.6 | 1.2 | 1.2 | 1.2 | 0.6 | 1.2 | | | | | | | | | | | | | 3.9 |

TABLE 11

| AIR VELOCITY F.P.M. | TEMP: 475¼ F. TIME: 70 sec. | | | | | | | | | | | | | | | | | | | | AVERAGED RATINGS |
|---|---|---|---|---|---|---|---|---|---|---|---|---|---|---|---|---|---|---|---|---|---|
| | TEST: 1 | | | | 2 | | | | 3 | | | | 4 | | | | 5 | | | | |
| | H | C | T | B | H | C | T | B | H | C | T | B | H | C | T | B | H | C | T | B | |
| 2400 | 0.2 | 0.6 | 1.8 | 1.2 | 0.2 | 0.6 | 1.8 | 1.2 | 0.2 | 1.2 | 2.4 | 0.8 | 0.2 | 1.2 | 1.2 | 0.8 | | | | | 5.7 |
| 2100 | 0.2 | 2.4 | 2.4 | 1.2 | 0.2 | 2.4 | 2.4 | 1.2 | | | | | | | | | | | | | 8.0 |
| 1800 | 0.2 | 1.8 | 1.8 | 1.2 | 0.2 | 2.4 | 2.4 | 0.2 | 0.2 | 2.4 | 2.4 | 0.2 | 0.2 | 2.4 | 2.4 | 1.6 | | | | | 8.2 |
| 1500 | 0.2 | 1.2 | 1.2 | 1.2 | 0.2 | 1.2 | 1.2 | 1.2 | | | | | | | | | | | | | 5.6 |
| 1000 | 0.2 | 0.6 | 0.6 | 1.2 | 0.2 | 0.6 | 0.6 | 1.2 | 0.2 | 0.6 | 0.6 | 1.2 | 0.2 | 0.6 | 1.2 | 1.2 | | | | | 4.6 |

TABLE 12

| AIR VELOCITY F.P.M. | TEMP: 525¼ F. TIME: 70 sec. | | | | | | | | | | | | | | | | | | | | AVERAGED RATINGS |
|---|---|---|---|---|---|---|---|---|---|---|---|---|---|---|---|---|---|---|---|---|---|
| | TEST: 1 | | | | 2 | | | | 3 | | | | 4 | | | | 5 | | | | |
| | H | C | T | B | H | C | T | B | H | C | T | B | H | C | T | B | H | C | T | B | |
| 2400 | 0.2 | 0.6 | 0.6 | 0.4 | | | | | | | | | | | | | | | | | 3.6 |
| 2100 | | | | | | | | | | | | | | | | | | | | | |
| 1800 | 0.2 | 1.8 | 1.2 | 0.4 | | | | | | | | | | | | | | | | | 5.4 |
| 1500 | | | | | | | | | | | | | | | | | | | | | |
| 1000 | 0.8 | 0.6 | 0.6 | 0.8 | | | | | | | | | | | | | | | | | 2.8 |

From Tables 1–6, it will be observed that for a heating time of 50 seconds, the highest ratings were obtained generally with the air temperature 475° F. and the air velocity 1800 F.P.M., and about the same with the air temperature 525° and the air velocity 1800 F.P.M., both on the unweighted and weighted bases. Similarly, from Tables 7–12, it will be observed that for a heating time of 70 seconds, the highest ratings were obtained generally with the air temperature 475° F. and the air velocity 1800 F.P.M., both on the unweighted and weighted bases. The 50-70 second heating time, 475° F. air temperature and 1800 F.P.M. air velocity are regarded as optimal.

From the above, it will appear that the method of this invention is effective for efficiently, rapidly and safely preparing in a self-serve type of operation partially or fully precooked french fried potatoes, supplied in a refrigerated or frozen state, for being eaten, with the potatoes so cooked, solely by hot air (no microwave or other type of heating being required), as to be hot, crisp and tasty, and comparable to french fried potatoes freshly fried in a deep fry cooker. A broad aspect of the invention is the utilization of the relatively high velocity hot air blowing on the pieces in the pan and so spread and directed relatively to the pieces that substantially all the exposed surfaces of the pieces are substantially simultaneously contacted by the air for rapid heat transfer.

FIGS. 11–13 illustrate a modification, which is presently preferred, of the door of the oven and its latching means, wherein the door, designated 85a, is secured between side arms 89a of a flap 91a pivoted at 93a. The side arms 89a extend down from the sides (ends) of the flap on the inside of and closely adjacent the rails 73, and the door extends between the side arms at their rearward ends. Spring 99a biases the flap to swing upward to raise the door to its closed position. Here again the flap is adapted to be swung down to open position by the camming engagement of a pan 9 with the flap as the pan is slid inwardly between the rails 73. Latching means indicated generally at 201 in FIGS. 12 and 13 is provided for latching the door in its open and closed positions, this means being a mechanical latching means as distinguished from the electrical latching means 101 of FIG. 5, and comprising a left-hand latch means and a right-hand latch means each comprising a latch lever 203 pivoted at its upper end as indicated at 205 having a latch pin 207 adjacent its lower end adapted to enter either an upper hole 109a or a lower hole 111a in the respective side arm 89a of the flap 91a. Each latch lever is spring-biased to swing to its latching position as illustrated in FIG. 13 for the right-hand latch lever 203, and is adapted to be swung out from its latching position to retract the latch pin 207 from either of the holes 109a, 111a in the respective side arm 89a of the flap 91a by reason of having a cam finger 209 engageable by the respective side flange portion 15 of a pan 9. The solenoid 103 is retained in conjunction with the FIGS. 11-13 modification for locking the door 85 during a cleaning cycle, and the circuit is generally the same as shown in FIG. 10 with switches 163 omitted and with a direct connection between thermostat 173A and the solenoid so that the solenoid is controlled solely by the thermostat 173A.

The door 85a is normally latched up in its closed position by engagement of pins 207 in the lower holes 111a in the flap side arms 89a, and the arrangement is such that as a pan 9 is slid into the oven, side flange portions 15 of the pan engage the fingers 209 of the left-hand and right-hand latch levers 203 and swing these levers out to retract the latch pins 207 from the holes 111a to allow the door 85a to be cammed down to open position by the pan. When the side flange portions 15 of the pan pass the fingers 209, the latch levers 203 swing in and pins 207 enter the upper holes 109a to latch the door down and open. When the pan is pulled out, side flange portions 15 of the pan engage the fingers 209 and swing levers 203 out to retract the pins 207 from the holes 109a. The door 85a springs up against the bottom of the pan and thereby stays open until the pan is pulled out past the door, whereupon the door springs up to its closed position. At this point, the side flange portions 15 of the pan have released the fingers 209 and levers 203 swing in and pins 207 enter holes 111a to latch the door up in its closed position.

While the receptacle as described is a one-time use disposable receptacle functioning as both a pan for containing the food F for being heated and as a serving pan, it is to be understood that, within the broad concept of the invention, the receptacle may be reusable, e.g., one that has the food placed in it for being heated and from which the heated food is transferred to a service plate, tray, or receptacle. In this regard, the receptacle may be an integrated part of the oven, rather than a wholly separate part.

In view of the above, it will be seen that the several objects of the invention are achieved and other advantageous results attained.

As various changes could be made in the above methods without departing from the scope of the invention, it is intended that all matter contained in the above description or shown in the accompanying drawings shall be interpreted as illustrative and not in a limiting sense.

What is claimed is:

1. The method of heating food in a convection oven, comprising:

placing the food in a pan;

inserting the pan containing said food through an access opening in a convection oven into a compartment in the oven at the lower end of a ductwork system in the oven, said ductwork system comprising an air delivery passage, adapted for delivery of air from a lower end thereof down into the pan in said compartment and an air return passage extending up from the lower end of said ductwork system, interengaging the pan, all around the pan, with the lower end of said ductwork system to cause the pan to cooperate with the air delivery and air return passages in the ductwork system and to form a generally closed passage, including the pan and the air delivery and air return passages, through which heated air is confined to flow from the air delivery passage to the air return passage, and flowing heated air down through the air delivery passage into the pan, through the pan, and thence up and out of the pan through the air return passage, with substantially all of the heated air exiting from the lower end of the air delivery passage flowing through the pan and over and around the food in the pan and thence up and out of the pan through the air return passage.

2. The method of claim 1 wherein the pan is a one-time use disposable pan of paper or the like of relatively low thermal conductivity, the pan having a handle, the handle being out of circulation of the heated air and remaining cool for handling the pan, and wherein the pan is used, following the heating, as a plate for serving the food, and is then disposed of.

3. The method of claim 1 wherein the air flows through the pan at a velocity of above 1000 feet per minute as it impinges on the food in the pan and at a temperature above 425° F. as it impinges on the food in the pan, with the air so spread and directed relative to the food that substantially all the exposed surfaces of the food are substantially simultaneously contacted by the air for rapid heat transfer to rapidly heat the food, solely by the air, to a state for being eaten.

4. The method of claim 3 wherein the pan is a one-time use disposable pan of paper or the like of relatively low thermal conductivity, the pan having a handle, the handle being out of circulation of the heated air and remaining cool for handling the pan, and wherein the pan is used, following the heating, as a plate for serving the food, and is then disposed of.

5. The method of claim 3 for heating a serving of partially or fully precooked french fried potatoes supplied in a refrigerated or frozen state wherein the air is blown on the potatoes at a velocity of from about 1500 F.P.M. to 2000 F.P.M. and at a temperature from above 425° F. to 525° F. as it impinges on the potatoes, and heats the potatoes to said state in less than about 75 seconds.

6. The method of claim 5 wherein the pan is a one-time use disposable pan of paper or the like of relatively low thermal conductivity, the pan having a handle, the handle being out of circulation of the heated air and remaining cool for handling the pan, and wherein the pan is used, following the heating, as a plate for serving the potatoes, and is then disposed of.

7. The method of claim 3 for heating a serving of partially or fully precooked french fried potatoes supplied in a refrigerated or frozen state wherein the air is blown on the potatoes at a velocity of about 1800 feet per minute and at a temperature of about 475° F. as it impinges on the potatoes for about 50-70 seconds.

8. The method of claim 7 wherein the pan is a one-time use disposable pan of paper or the like of relatively low thermal conductivity, the pan having a handle, the handle being out of circulation of the heated air and remaining cool for handling the pan, and wherein the pan is used, following the heating, as a plate for serving the potatoes, and is then disposed of.

* * * * *